Patented Feb. 20, 1945

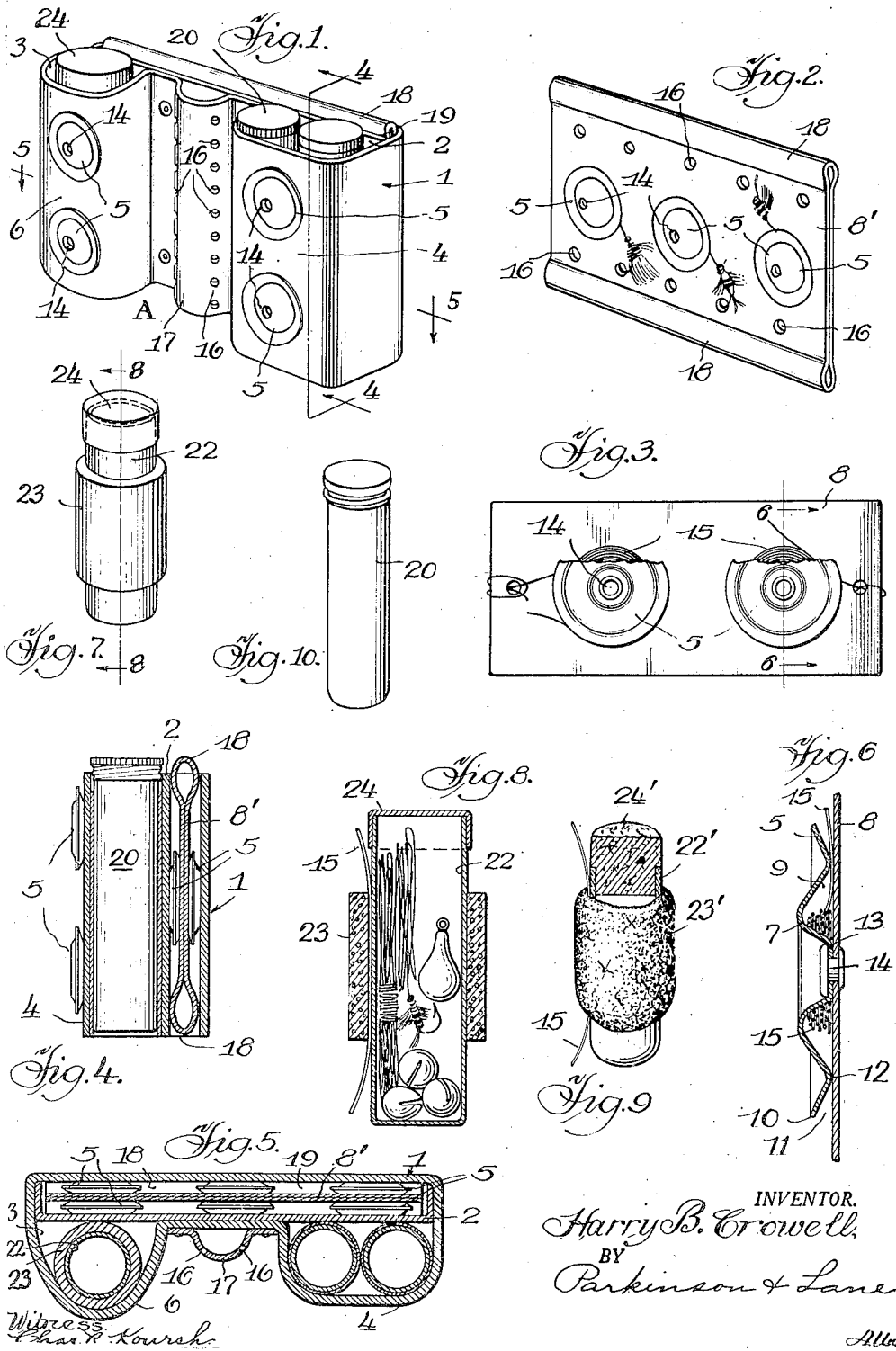

2,370,013

UNITED STATES PATENT OFFICE 2,370,013

FISHING APPARATUS

Harry B. Crowell, Evanston, Ill.

Application April 8, 1943, Serial No. 482,289

4 Claims. (Cl. 43—31)

This invention relates to apparatus for fishing and more particularly to improved means for efficiently carrying and rendering easily and quickly available items of fishing apparatus such as leaders, hooks, sinkers, bobbers and the like, and to also provide convenient and handy means for accessibly supporting thread and other filamentous material.

Fishermen, and especially those who fish only occasionally for sport and not for a livelihood, find it quite difficult to have their fishing apparatus so arranged in compact form that it is instantly available when starting a fishing trip, and the parts quickly accessible for use upon arriving at their destination. I have accomplished these objects in the present invention, as well as having provided apparatus that is pleasing in appearance and efficient and convenient in use.

Among the further objects of my invention I have provided novel apparatus for storing the leaders and hooks in such manner that they are instantly available for use in orderly manner without having become unduly loose or tangled, as well as to store for instant accessibility thread or the like for use in the household independently of fishing.

Another object of my invention is to provide a novel holder for materials of uniform thickness and also material of various thickness, coarse or fine, that have been cut and knotted or tied together and tapering from coarse to fine, such as nylon or synthetic gut leaders used in fly fishing, thread and the like of such nature that a commodious storage space is available in the body of the holder for such knotted and tied materials, and the end or ends of the leaders, thread or the like are releasably gripped between the edge portions of the holder and the backing upon which the holder is supported, in such manner as to be held against accidental separation therefrom and at the same time be removable by a slight pull or by unwinding when desired.

A further object is to provide novel means for holding fishhooks in place, said fishhooks being preferably secured to the end of a leader that is wound upon an adjacent holder.

A still further object is to provide a novel bobber that may be stored in a container or kit or used as a single complete fishing unit having the leader or thread holders and hook holders referred to above as well as other fishing accessories, said bobber serving as a float and also for storage of light accessories such as leaders, hooks, one or more sinkers, line and the like.

Another object is to provide a bobber formed of a hollow water-tight part and a slidable sleeve-like part, so arranged that a leader or line may be removably gripped between the parts to hold the bobber at any desired place on the leader or line while being used for fishing.

A further object is to provide in the container or kit a removable support having any desired number of leader or thread holders and hook securing openings, said removable support being capable of use either with the kit or independently thereof as desired.

Other objects, advantages and capabilities will later more fully appear.

My invention further resides in the combination, construction and arrangement of parts illustrated in the accompanying drawing, and while I have shown therein preferred embodiments I wish it understood that the same are susceptible of modification and change without departing from the spirit of my invention.

In the drawing:

Fig. 1 is a perspective view of a container or kit for fishing apparatus embodying my invention.

Fig. 2 is a perspective view of a removable support, removed from the container or kit, and showing three holders for leaders, line, thread or the like with hooks attached and removably anchored in the support.

Fig. 3 is a plan view of a modified form of support showing two holders, partly broken away, with leaders, line, thread or the like in place therein.

Fig. 4 is a transverse section on the line 4—4 of Fig. 1.

Fig. 5 is a longitudinal section on the line 5—5 of Fig. 1.

Fig. 6 is a transverse section on the line 6—6 of Fig. 3, through a support and holder showing a leader, line, thread or the like therein.

Fig. 7 is a perspective view of a bobber embodying my invention.

Fig. 8 is a longitudinal section on the line 8—8 of Fig. 7 through the bobber of Fig. 7 on a larger scale.

Fig. 9 is a perspective view of a modified form of bobber with parts shown in section for clearness.

Fig. 10 is a perspective view of one of the tubes to be removably mounted in one of the compartments of the container or kit, and adapted to hold accessory fishing parts.

Referring more in detail to the drawing, Fig. 1 shows a container or kit A having an outer wall 1, and formed at its ends with compartments 2 and 3. The compartment 2 has a front wall 4, the outer face of which is flat at least for a width equal to the diameter of the gripping portions of the edges of the annularly concaved disk-like holders 5. An outer face 6 is provided on the front of the wall forming the compartment 3. On each of the faces 4 and 6 I have shown two of the holder disks 5, but any other number, one or more, may be used as desired.

As seen in Fig. 6, a resilient disk-like holder 5 is formed with an annular outwardly curved wall 7 which as it continues radially outwardly is formed to contact the adjacent flat surface of the supporting element 8 to provide an annular space 9 between the support and the holder. The marginal edge portion 10 is inclined outwardly away from the support to provide an annular tapering space 11 the inner edge of the marginal portion 10 contacting the adjacent face of the support at the gripping portion 12 with sufficient resiliency to yield to permit a leader, line, thread or the like to be forced therethrough from the exterior to the interior of the space 9 to enable it to be wound therein for storing and to be quickly available for use. The central depressed portion 13 is held against the support 8 by a headed grommet, rivet, eyelet or the like 14. The holders 5 may be made of suitably treated cardboard, resinous or other plastics, or any other material suitable for the purpose. The material of which the holders are made will be of sufficient resiliency to permit the entry, by winding, of the leaders, line, thread or the like 15, past the gripping portion 12 into the cavity 9 and also permit its removal by unwinding and pulling it outwardly past the gripping portion 12 when desired for use. The free end of the leader, line, thread or the like is shown gripped underneath the gripping portion 12 to be retained there and ready to be pulled outwardly therefrom by unwinding when desired. The leader, line, thread or the like is frictionally held between the gripping portion 12 and the supporting element 8, and after the desired amount is unwound, the remaining portion will be held between these parts in any desired position of adjustment.

A leader with a fishhook secured thereto may be wound underneath the holder 5 and the hook held in place by inserting the point through one of the openings 16 formed in the raised central portion 17 of the kit A in Fig. 1, or the support 8' of Fig. 2. The holder 8' is provided along two of its edges with a reinforcing bead 18 of a size to hold the support within the compartment 19 and yet permit its ready removal by a slight lateral push on one edge and a pull on the bead on the other edge. The construction of the disk-like holders 5 is the same in Figs. 1, 2, 3, 4 and 5 as that shown in Fig. 6. Support 8' also has a plurality of holders 5 on both sides as seen in Figs. 4 and 5.

The compartment 2 of kit A, as seen in Fig. 1 is adapted to removably contain one or more (two being shown) tubes 20 with removable covers, these tubes being adapted to receive any fishing accessories desired such as extra line, leaders, hooks, small sinkers, and the like. Compartment 3 is shown in Fig. 1 as containing a bobber or floater, which may be readily removed therefrom for use as desired, and which bobber is shown more in detail in Figs. 7, 8 and 9.

A floater or bobber (shown in Figs. 7, 8, 9 and 1) comprises a hollow, tubular member 22, having a sealing closure 24, the tubular member fitting snugly inside a sleeve 23, and being removable therefrom when it is desired to insert a leader or line 15 through the bore in the sleeve after which the tubular member will be inserted into the sleeve to grip the leader or line between the tubular member and sleeve to frictionally hold the leader or line in the bobber against movement with respect thereto to enable the bobber to be used at any desired part of the line in fishing. Such line or leader 15 is shown gripped between the sleeve and the tubular member in fishing position in Figs. 8 and 9. The interior of the tube is adapted to contain fishing accessories such as leaders, line, hooks and the like. As constructed the bobber will float. The sleeve 23 is preferably of plastic material, although it may be of cork, wood, or any other suitable material desired.

The bobber shown in Fig. 9 is similar to that shown in Figs. 7 and 8 except that in Fig. 9 the sleeve 23' is shown to be of cork and a slightly different form of sealing closure such as a cork or stopper 21' is used.

It is thus seen that I have provided a fishing apparatus that is instantly available to be taken on a fishing trip, is neat, compact, of pleasing appearance amply outfitted with accessories, can be carried in the pocket, and only requires the cutting of a pole (unless a pole is already available) to be handy for use.

Having described my invention, I claim:

1. A support comprising a flat member having one or more openings therein for receiving a portion of a fishing hook, and a disc-shaped holder having a central portion thereof in contacting relation with and secured to one side of the support, a concaved portion and an outer portion in contact with the support, the latter portion being movable but adapted to have a gripping effect on a line whereby a hook positioned in any one of the openings may be held therein by positioning a line attached thereto in coiled relation within the concaved portion of the holder while maintaining the free end of the line between the support and the outer portion of the holder that normally contacts the support.

2. A support comprising a substantially flat member having a plurality of spaced openings, and one or more disc-shaped holders each having a central portion in contacting relation with and secured to one side of the support, a concaved portion and an outer annular, resilient gripping portion in yielding contact with the support, the latter portion being movable but adapted to have a yieldable gripping effect on a line whereby a hook positioned in one of the openings may be held therein by positioning the line attached thereto in coiled relation within the concaved portion of the holder while maintaining the free end of the line between the support and the outer gripping portion of the holder that normally yieldingly contacts the support.

3. In combination, a support comprising a substantially flat member, and a disc-shaped holder having a central depressed portion in contacting relation with and secured to one side of the support, a concaved portion and an outer resilient portion normally in continuous yielding contact with the support with the concaved portion providing an annular space for receiving and retaining a length of line, the outer portion being yieldable but adapted to have a gripping effect on the free end of the line when coiled within the concaved portion of the holder.

4. In combination, a support comprising a substantially flat member, and a disc-shaped holder having a depressed central portion in contacting relation with and secured to one side of the support, a concaved portion merging into a continuous annular, resilient portion normally maintained in yielding gripping contact with the support with the concaved portion between the depressed central portion and annular gripping portion providing an annular space for receiving and retaining a length of line and an outer marginal portion flaring outwardly from the support for directing and guiding the line into the concaved portion, the gripping portion being movable but adapted to have a gripping effect on the free end of the line when it is coiled within the concaved portion of the holder.

HARRY B. CROWELL.